(12) United States Patent
Schneider

(10) Patent No.: US 8,939,260 B2
(45) Date of Patent: Jan. 27, 2015

(54) DOUBLE-CLUTCH TRANSMISSION OF A VEHICLE

(71) Applicant: ZF Friedrichshafen AG, Friedrichshafen (DE)

(72) Inventor: Thomas Schneider, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 125 days.

(21) Appl. No.: 13/678,601

(22) Filed: Nov. 16, 2012

(65) Prior Publication Data

US 2013/0134007 A1 May 30, 2013

(30) Foreign Application Priority Data

Nov. 28, 2011 (DE) .......................... 10 2011 087 164

(51) Int. Cl.
*F16D 25/10* (2006.01)
*B60K 17/08* (2006.01)
*F16H 57/04* (2010.01)
*F16H 3/00* (2006.01)
*F16D 21/06* (2006.01)

(52) U.S. Cl.
CPC ............... *F16D 25/10* (2013.01); *B60K 17/08* (2013.01); *F16H 57/0401* (2013.01); *F16H 57/0441* (2013.01); *F16H 3/006* (2013.01); *F16H 57/0494* (2013.01); *F16H 57/0454* (2013.01); *F16D 21/06* (2013.01); *F16D 2300/26* (2013.01)
USPC .............................. 184/6.12; 184/6.4; 184/7.4

(58) Field of Classification Search
USPC .......................................... 184/6.12, 6.4, 7.4
See application file for complete search history.

(56) References Cited

U.S. PATENT DOCUMENTS

| 4,787,271 | A | * | 11/1988 | Brogdon ........................ 475/140 |
| 5,467,668 | A | * | 11/1995 | Kameda et al. ............. 74/606 R |
| 6,044,931 | A | | 4/2000 | Reed, Jr. et al. |
| 7,165,651 | B2 | * | 1/2007 | Hiraga .......................... 184/6.12 |
| 7,837,453 | B2 | | 11/2010 | Barthel et al. |
| 7,845,470 | B2 | * | 12/2010 | Smolong et al. ............. 184/6.12 |
| 2006/0078437 | A1 | | 4/2006 | Gumpoltsberger et al. |
| 2006/0278475 | A1 | * | 12/2006 | Takahashi et al. ........... 184/6.12 |
| 2010/0307883 | A1 | | 12/2010 | Patzner et al. |
| 2012/0247875 | A1 | * | 10/2012 | Suzuta et al. ................. 184/6.12 |

FOREIGN PATENT DOCUMENTS

DE 10 2004 046 297 A1 3/2006
DE 10 2004 045 425 A1 4/2006

(Continued)

OTHER PUBLICATIONS

German Search Report Corresponding to DE 10 2011 087 164.0.

*Primary Examiner* — William A Rivera
*Assistant Examiner* — Michael Riegelman
(74) *Attorney, Agent, or Firm* — Davis & Bujold, PLLC; Michael J. Bujold

(57) ABSTRACT

A double clutch transmission of a vehicle having an internal combustion engine and a clutch chamber (3) which is designed as a first oil chamber, for accommodating a double clutch, and a transmission chamber (8) which is designed as a second oil chamber, for accommodating a double clutch transmission gear set. A partition wall (9) separates the oil chambers from one another. An oil pump (11) is positioned in the transmission chamber (8) and can be driven by a drive shaft (7) which extends through the partition wall (9) from the transmission chamber (8) into the clutch chamber (3).

11 Claims, 3 Drawing Sheets

(56) References Cited

FOREIGN PATENT DOCUMENTS

| DE | 10 2004 055 121 A1 | 5/2006 |
| --- | --- | --- |
| DE | 10 2005 042 360 A1 | 3/2007 |
| DE | 10 2006 026 631 A1 | 12/2007 |
| DE | 10 2008 005 239 A1 | 7/2009 |
| DE | 10 2008 031 456 A1 | 1/2010 |
| EP | 1 954 965 B1 | 8/2009 |

* cited by examiner

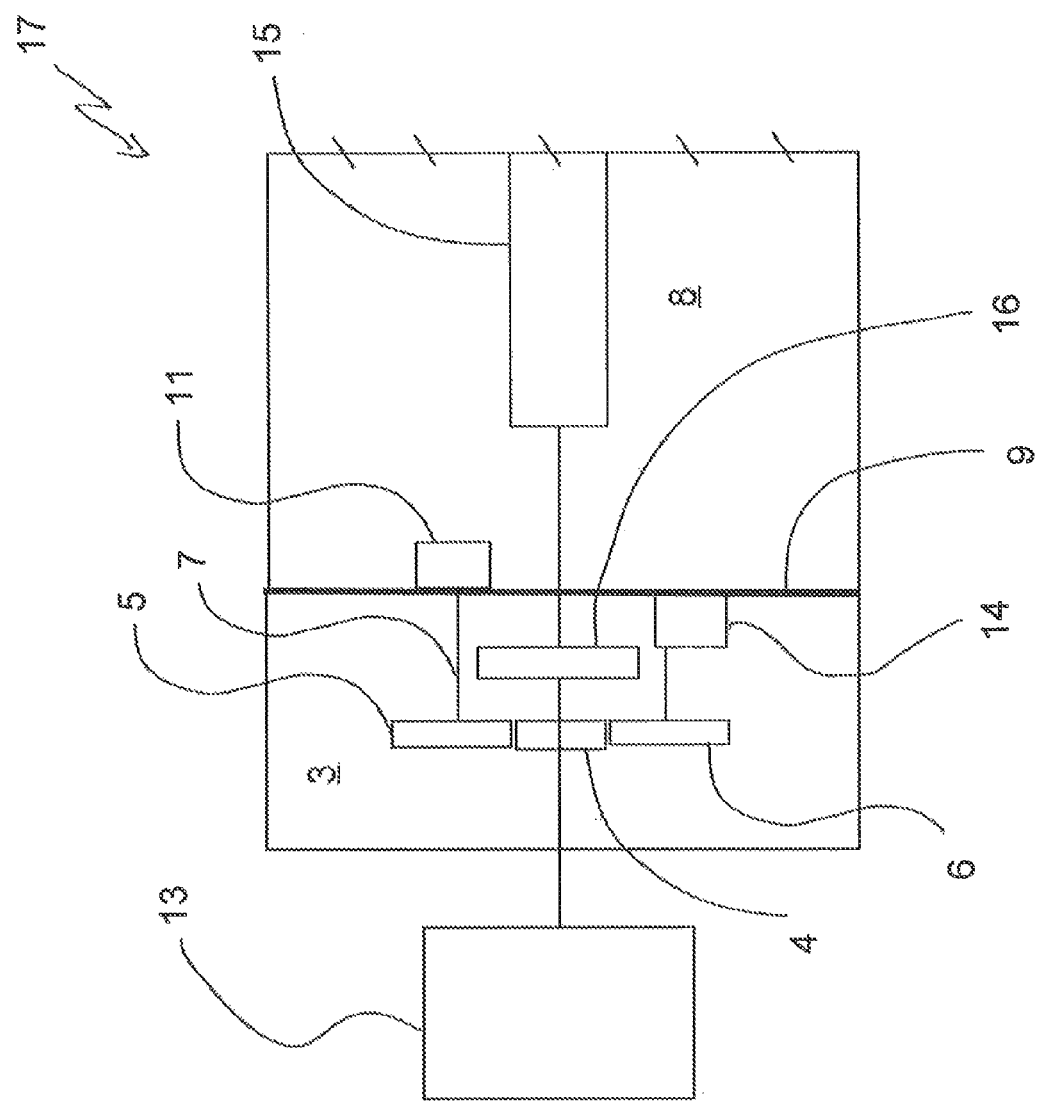

DOUBLE-CLUTCH TRANSMISSION OF A VEHICLE

This application claims priority from German patent application serial No. 10 2011 087 164.0 filed Nov. 28, 2011.

FIELD OF THE INVENTION

The invention relates to a dual clutch transmission of a motor vehicle known from EP 1954965 B1.

BACKGROUND OF THE INVENTION

From EP 1 954 965 B1(to which U.S. patent publication No. 2010/0307883 A1 corresponds), in which the applicant is named as the assignee, a double clutch transmission having a so-called oil chamber partition, that is to say, having a first oil or clutch chamber that accommodates a double clutch and a second oil or transmission chamber that accommodates a double clutch gear set transmission, called in short a gear set. The oil chamber partition in a double clutch transmission enables the use of different oils for the wet running double clutch and lubrication of the gear set. The clutch chamber and the transmission chamber are separated by a partition wall. The double clutch has two coaxially positioned drives, a center shaft and a hollow shaft, which extend from the clutch chamber through the partition wall into the transmission chamber. Hereby, the hollow shaft is sealed in its circumferential area with respect to a bore in the partition wall, while the central shaft is sealed with respect to the hollow shaft.

SUMMARY OF THE INVENTION

Based on the state of the art, the object of the present invention is to secure the oil supply in both oil chambers, meaning for the double clutch as well as for the transmission or rather the gear set.

In accordance with the invention, the above mentioned state of the art has an oil pump which is positioned in the transmission chamber and which can be driven by a drive shaft which extends through the partition wall. That has the advantage that the transmission chamber or the gear set which is positioned in the transmission chamber, respectively, is supplied with oil by a separate oil pump which can be driven by the internal combustion engine of the motor vehicle. The separate oil pump, also called a gear set pump, conveys preferably lubrication oil for injection lubrication of the gear wheels of a gear set.

In a preferred embodiment, the oil pump can be driven via the drive shaft at the rotational speed of the combustion engine, meaning the input rotational speed for the transmission. This ensures that in all locations of the operation the required and conveyed amounts and pressures are provided for the functioning of the injection lubrication. It is also advantageous that the gear set pump, due to its mechanical drive, has a relatively high efficiency, especially compared to an electrically driven oil pump.

In an additional advantageous embodiment, the drive shaft is driven via a spur gear stage, which is positioned in the clutch chamber, meaning at the output side of the combustion engine. Hereby, the spur gear is driven by the combustion engine and in turn drives a spur gear which is positioned on the drive shaft of the gear set pump.

In an additional advantageous embodiment, the drive shaft which is extends through a bore in the partition wall, is sealed relative to the partition wall by suitable sealing members, such as for instance radial shaft seal rings. This ensures that separation of the oil chambers is maintained—despite the drive shaft for the gear set pump.

In an additional preferred embodiment, the oil pump comprises of a pump shaft which mates with the drive shaft via a connector. Thus, making easy installation of the oil pump in the gear set chamber possible, creating at the same time a rotationally fixed connection with the drive shaft. The connector is preferably designed as spline meshing.

In another advantageous embodiment, the oil pump is designed as a gear wheel pump. Thus, relatively large pressures can be provided for the injection lubrication.

In another advantageous embodiment, an additional pump is provided, meaning a hydraulic pump, which is also driven by the internal combustion engine. Here—also in the clutch chamber—an additional spur gear can be provided, which is positioned on a pump drive shaft for the hydraulic pump. Therefore, both pump drives or gear drive wheels, respectively, can be positioned in the clutch chamber and can be driven by the engine.

BRIEF DESCRIPTION OF THE DRAWINGS

An embodiment of the invention is illustrated in the drawing and will be described in greater detail, wherein further characteristics and/or advantages can arise from the description and/or the drawing. These show:

FIG. 3 is a very schematic depiction of the engine and the double clutch transmission.

DETAILED DESCRIPTION OF THE PREFERRED EMBODIMENTS

Figure 1:
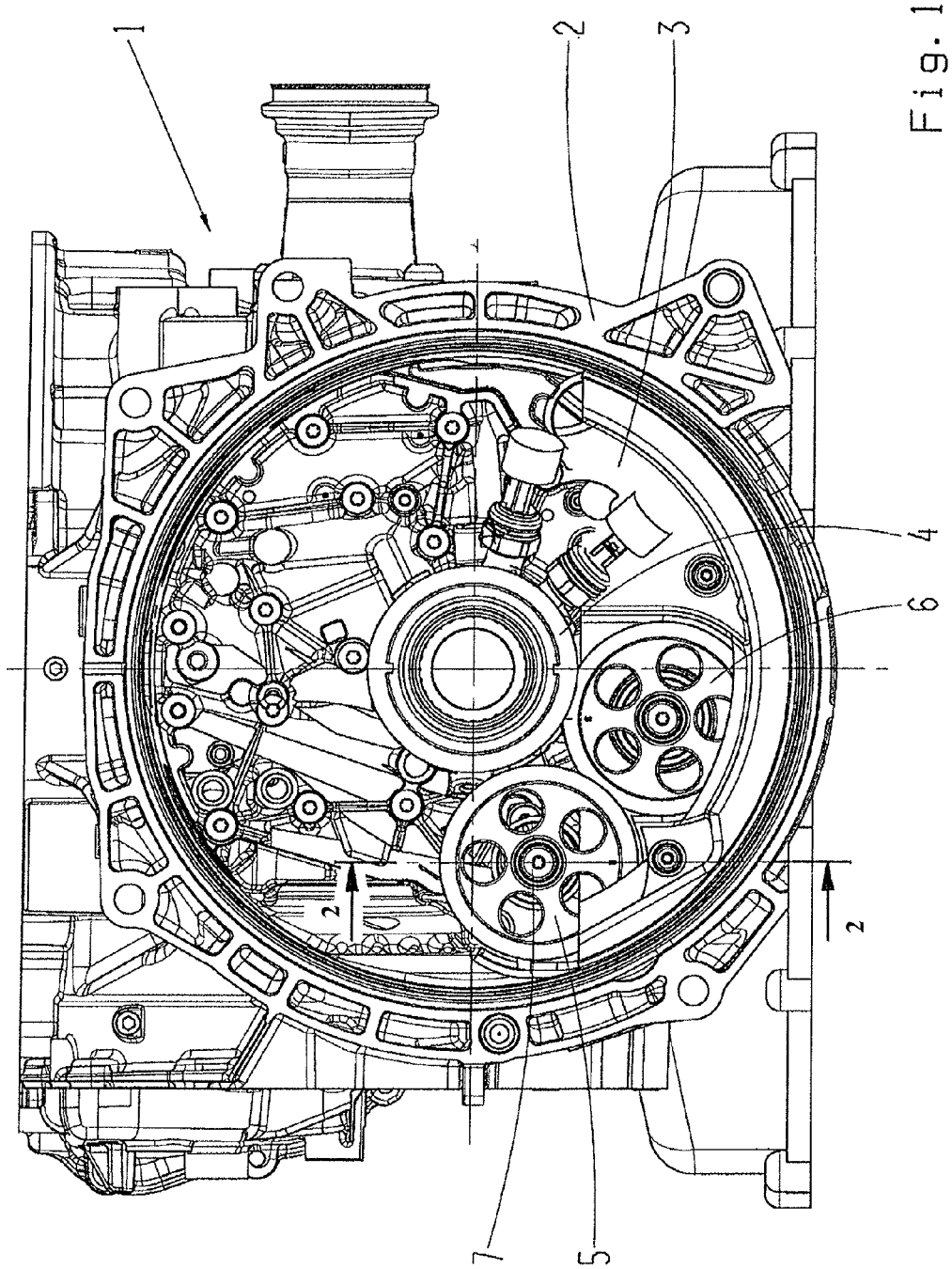
FIG. 1 a view in the axial direction on the output side of an engine block.

FIG. 1 shows the output side of the engine block 1 of an internal combustion engine for a motor vehicle. At the engine block 1, an approximately circular designed flange 2 is positioned at which a double clutch transmission 17, as diagrammatically shown in FIG. 3, can be attached. The chamber inside of the flange 2 is referred to as a clutch chamber 3, or as a first oil chamber 3. A spur gear 4 is positioned in the clutch chamber 3 and is driven by the internal combustion engine 13 of the motor vehicle, and a first drive spur gear 5 for a gear set pump 11, shown in FIGS. 2 and 3, and a second drive spur gear 6 for a hydraulic pump 15, shown in FIG. 3. Both of the pump drive gears 5, 6 are driven by the internal combustion engine 13 via the spur gear 4. The first drive spur gear 5 is connected in a rotationally fixed manner with the drive shaft 7 for the gear set pump 11.

Figure 2:
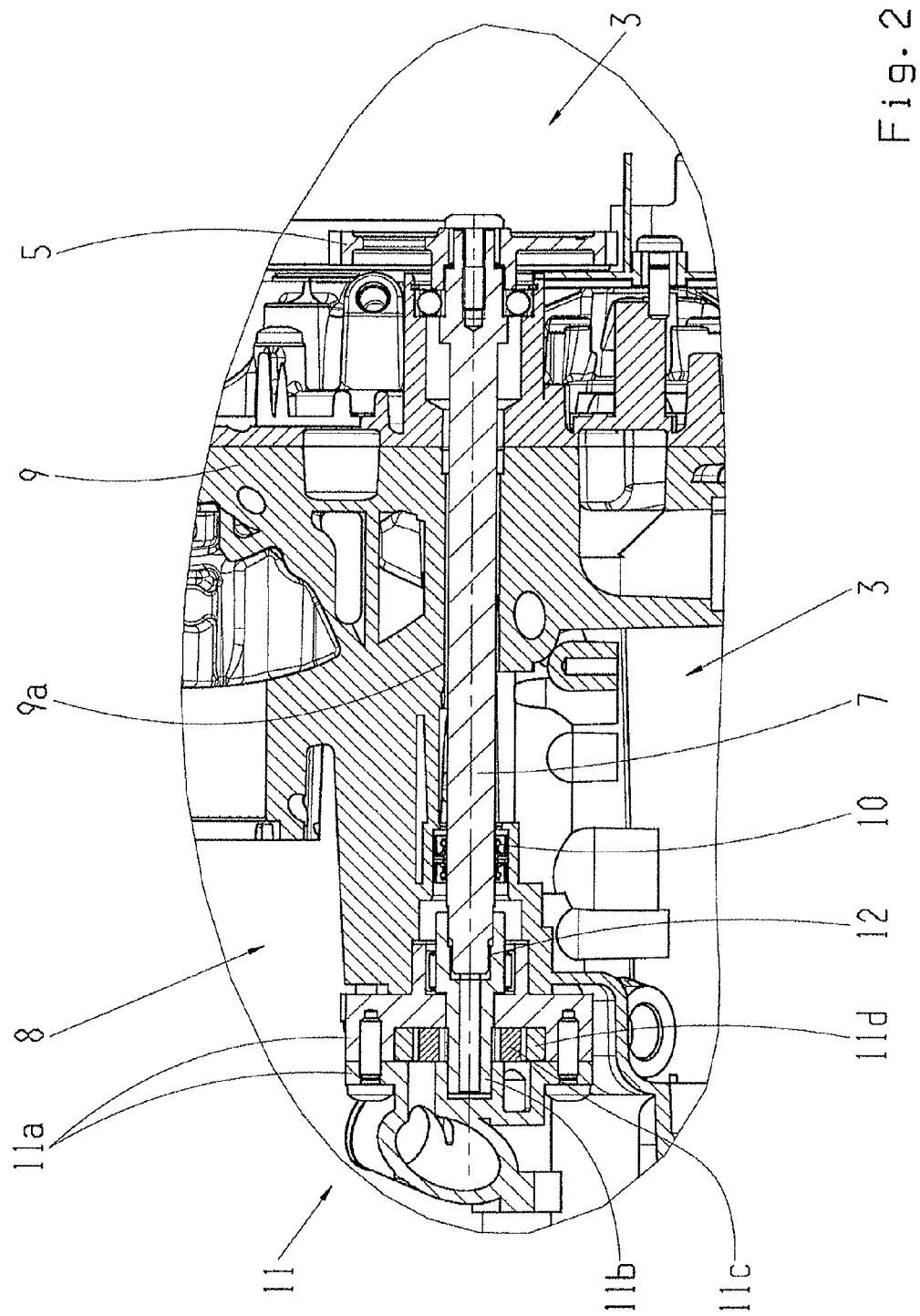
FIG. 2 a sectional view along the line 2-2 through the drive shaft of a gear set pump.

FIG. 2 shows an axial sectional view along the line 2-2 in FIG. 1. The axial section shows a section of a double clutch transmission with oil chamber separation, meaning with a first oil or clutch chamber 3 and a second oil or transmission chamber 8, which is also called gear set chamber 8 and accommodates the gear set 15 of a double clutch transmission shown in FIG. 3. A wet-running double clutch 16, also shown in FIG. 3, is positioned in the clutch chamber 3 and is driven by the internal combustion engine 13 and has two coaxially positioned drive shafts, which drive the gear set 15. For this the disclosure of the aforementioned U.S. 2010/0307883 A1, by reference thereto, is fully incorporated into the disclosure of the present application. Both oil compartments 3, 8 are separated by a partition 9 oil-tight manner.

The partition wall 9 is penetrated by the drive shaft 7, wherein the partition wall 9 has a boring 9a, through which the drive shaft 7 extends and which is sealed by sealing members 10, preferably radial shaft gasket rings. Within the gear set chamber 8, an oil pump 11, also called a gear set pump 11, is positioned at and fixed to the partition wall 9. The gear set pump 11 is designed as a gear wheel pump and comprises a housing 11a, a pump shaft 11b, an inner rotor 11c, as well as an outer rotor 11d. The pump shaft 11b is connected in a rotationally fixed manner, via a connector 12, with the drive shaft 7 and is herewith driven via the first drive spur gear 5 by means of the combustion engine. The oil pump 11 delivers preferably lubrication oil for injection lubrication of the gear wheels of the double clutch transmission gear set 15.

Independent of the gear set pump 11, the hydraulic pump 14 is provided which via the drive spur gear 6 (see FIG. 1) is also driven by the engine. Thus, two independent oil pumps 11, 14 are provided, wherein the hydraulic pump 14 engages in the oil supply of a control device and the double clutch 16 which is positioned in the clutch chamber 3.

REFERENCE CHARACTERS

1 Engine Block
2 Flange
3 Clutch Chamber (first oil chamber)
4 Spur Gear
5 First Drive Spur Gear
6 Second Drive Spur Gear
7 Drive Shaft
8 Gear Set Chamber (second oil chamber)
9 Partition Wall
9a Bore
10 Sealing Member
11 Oil Pump
11a Housing
11b Pump Shaft
11c Inner Rotor
11d Outer Rotor
12 Connector

The invention claimed is:

1. A double clutch transmission, for a motor vehicle with an internal combustion engine, comprising:
 a clutch chamber (3), comprising a first oil chamber accommodating a double clutch therein,
 a transmission chamber (8), comprising a second oil chamber accommodating a double clutch transmission gear set therein,
 a partition wall (9) separating the first and the second oil chambers from one another, and
 a first pump, comprising an oil pump (11), being positioned in the transmission chamber (8) and being driven by a drive shaft (7), and the drive shaft (7) extending through the partition wall (9) into the clutch chamber (3), and a second pump, which comprises a hydraulic pump that is drivable by the internal combustion engine, is positioned in the clutch chamber (3).

2. The double clutch transmission according to claim 1, wherein the drive shaft (7) is drivable by the internal combustion engine.

3. The double clutch transmission according to claim 1, wherein the drive shaft (7) is drivable by the combustion engine via a spur wheel gear (5) which is positioned in the clutch chamber (3).

4. The double clutch transmission according to claim 1, wherein the drive shaft (7) is sealed, with respect to the partition wall (9), by sealing members (10).

5. The double clutch transmission according to claim 1, wherein the oil pump (11) has a pump shaft (11b) which is connected with the drive shaft (7) by a connector (12).

6. The double clutch transmission according to claim 1, wherein the oil pump is a gear wheel pump (11).

7. The double clutch transmission according to claim 1, wherein the partition wall provides oil-tight separation between the transmission chamber and the clutch chamber.

8. The double clutch transmission according to claim 1, wherein the double clutch is a wet running double clutch.

9. The double clutch transmission according to claim 1, wherein clutch chamber is filled with a hydraulic oil, and the transmission chamber (8) is filled with a lubrication oil which is different from the hydraulic oil.

10. The double clutch transmission according to claim 1, wherein
 one of a pump drive and a gear drive wheel, that drives the drive shaft of the first pump, is positioned in the clutch chamber and is driven by the internal combustion engine, and
 one of a pump drive and a gear drive wheel, that drives the second pump, is positioned in the clutch chamber and is driven by the internal combustion engine.

11. A double clutch transmission of a motor vehicle having an internal combustion engine, the double clutch transmission comprising:
 first and second oil chambers,
 the first oil chamber accommodating a double clutch and a second oil pump and the second oil chamber accommodating a double clutch transmission gear set,
 the first and the second oil chambers being separated from one another by a partition wall,
 a first oil pump being located within the second oil chamber and being fixed to the partition wall, and the oil pump comprising a pump shaft,
 the partition wall comprising a bore through which a drive shaft extends, a first end of the drive shaft engaging with and being driven by a spur gear located within the first oil chamber and a second end of the drive shaft being continuously connected, via a connector, to the pump shaft such that drive shaft and the pump shaft rotate together,
 the spur gear, located in the first oil chamber, communicating with a further spur gear that is driven by the internal combustion engine such that the pump shaft is driven by the internal combustion engine, and
 a seal member being located within the bore and engaging with the drive shaft for sealing the first oil chamber with respect to the second oil chamber.

* * * * *